United States Patent [19]

Harries

[11] 4,020,636

[45] May 3, 1977

[54] MASTER CYLINDER ASSEMBLIES

[75] Inventor: David Anthony Harries, Solihull, England

[73] Assignee: Girling Limited, Birmingham, England

[22] Filed: Sept. 30, 1974

[21] Appl. No.: 510,593

[30] Foreign Application Priority Data

Oct. 2, 1973 United Kingdom ............ 46032/73

[52] U.S. Cl. .................................... 60/547; 60/581
[51] Int. Cl.[2] ...................... B60T 13/14; F15B 7/00
[58] Field of Search ............ 60/547, 550, 551, 548, 60/574, 575, 580, 581, 582; 188/347, 355; 91/6, 32

[56] References Cited

UNITED STATES PATENTS

| 2,372,013 | 3/1945 | Rockwell | 60/551 X |
| 2,481,991 | 9/1949 | Ernst | 60/574 X |
| 2,511,541 | 6/1950 | Purcell | 60/574 X |
| 3,712,176 | 1/1973 | Meyers | 91/6 |
| 3,871,497 | 3/1975 | Bessiere | 91/6 |

Primary Examiner—Paul E. Maslousky
Attorney, Agent, or Firm—Scrivener Parker Scrivener & Clarke

[57] ABSTRACT

In a master cylinder assembly a booster valve assembly is adapted to control two separate supplies of booster fluid, and each supply is capable of advancing a modulator piston independently to operate a master cylinder.

5 Claims, 3 Drawing Figures

MASTER CYLINDER ASSEMBLIES

SPECIFIC DESCRIPTION

This invention relates to master cylinder assemblies for vehicle hydraulic braking systems of the kind comprising a piston adapted to be advanced in a bore in a housing to generate fluid pressure in a pressure space in front of the piston, an inlet port in the housing being adapted to connect the pressure space to a fluid reservoir through a normally open valve which is closed when the piston is advanced, and an outlet port in the housing being adapted to connect the pressure space to at least one wheel brake.

According to the invention a master cylinder assembly comprises a housing having a first bore and a second bore, a modulator piston assembly working in said second bore, a master cylinder piston working in said first bore and adapted to be advanced in said first bore on advancement of the modulator piston assembly in said second bore, said housing being provided with a first pressure space defined in said first bore in front of said master cylinder piston, and with second, third, and fourth independent pressure spaces in said second bore and bounded by said modulator piston assembly pressurisation of said second pressure space causing said modulator piston assembly to be urged rearwardly, whereas pressurisation of either of said third or fourth pressure spaces causing said modulator piston assembly to be urged forwardly, said housing being provided with a first inlet port for connecting said first pressure space to a fluid reservoir, with an outlet port leading from said first pressure space for connection to a wheel brake, with second inlet port leading into said second pressure space, and with third and fourth inlet ports leading respectively into said third and fourth pressure spaces, a normally open valve controlling communication between said first pressure space and said first inlet port and being adapted to close on forward movement of said master cylinder piston from its retracted position, said master cylinder assembly further comprising a dual booster valve assembly comprising first and second hydralically separate booster valves, a single actuating member controlling both booster valves, said first booster valve being provided with a first booster valve inlet and a first booster valve outlet, said second booster valve being provided with a second booster valve inlet and a second booster valve outlet, said first and second booster valve inlets being connected to two separate supplies of pressure fluid, means connecting said first and second booster valve outlets independently to said third and fourth pressure spaces in said housing respectively, whereby on actuation of said actuating member pressure fluid is supplied to both said third and fourth pressure spaces when both of said pressure fluid supplies are operational, and is supplied to one of said third and fourth pressure spaces on failure of either of said supplies to advance the modulator piston assembly.

In our U.S. patent application Ser. No. 424,886, we have desclosed a master cylinder assembly of the kind set forth which comprises a modulator piston working in a second bore in the housing and adapted to advance the master cylinder piston, a booster valve assembly for applying booster fluid under pressure to advance the modulator piston, and a control port in the housing leading into the second bore in advance of the modulator piston. In our U.S, patent application Ser. No. 424,886, the booster valve assembly controls one supply of booster fluid to advance the modulator piston. In the event of failure of the supply of booster fluid a pedal-operated member is arranged to advance the modulator piston mechanically so that the master cylinder can still be operated although without the influence of anti-skid control means. This is perfectly satisfactory for certain relatively light vehicles but for heavier vehicles the driver may not be able to apply sufficient force to the pedal for adequate braking in the event of a failure in the power supply.

The booster valve assembly is thereby arranged to control two separate supplies of booster fluid, each supply being capable of advancing the modulator piston independently.

Thus, in the event of failure of one supply of booster fluid, the second supply will be sufficient to apply the brakes.

The master cylinder assembly is therefoe suitable for use in vehicles of the said heavier type where two supplies of booster fluid provide a more effective safeguard against a power failure.

Preferably the modulator piston assembly comprises a portion of larger diameter in front of a portion of smaller diameter, said third pressure space being defined behind said portion of smaller diameter, and said fourth pressure space being defined between a step in said second bore and said larger diameter portion.

Conveniently the booster valve assembly is pedal-operated and remote from the housing for the master cylinder piston and the modulator piston. This facilitates installation in vehicles, particularly where space is at a premium. Furthermore, in the event of failure of one supply of booster fluid, the application of the brakes in response to the other supply of booster fluid can be regulated by anti-skid control means.

The master cylinder assembly of this invention may be incorporated in a braking system having three separate supplies of fluid under pressure, two supplies connected to the booster valve assembly and the third connected to the second inlet through skid control means.

In any one master cylinder assembly according to this invention there may be one, two, three or more master cylinder pistons and any or each master cylinder piston may be the primary piston of a tandem master cylinder.

An example of a master cylinder assembly according to this invention and an example of a braking system in which it may be used are illustrated in the acccompanying drawings in which.

Figure 1:
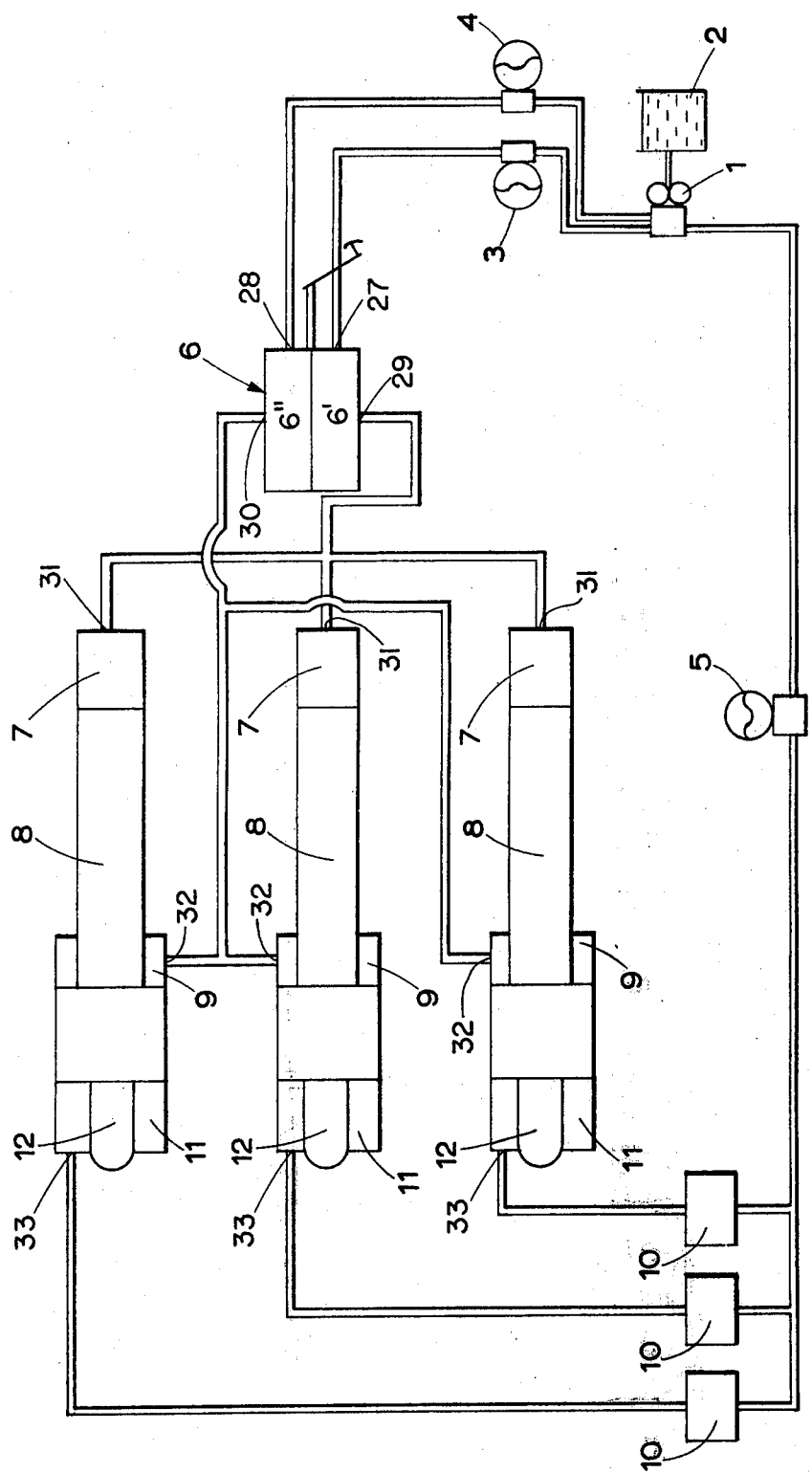
FIG. 1 is a diagram of a braking system.

In the braking system shown in FIG. 1 a pump 1 drawing hydraulic fluid from a reservoir 2 pressurises three hydraulic accumulators 3, 4 and 5. Two of the accumulators 3,4 supply booster fluid at a first pressure to first and second booster inlets 27 and 28 respectively, of a pedal-operated dual booster valve assembly 6 comprising a first booster valve 6' and a second booster valve 6" which connect the inlets 27 and 28 separately to first and second booster outlets 29 and 30 respectively. An example of a well known dual booster valve assembly is shown in U.S Patent No. 3,905,656 assigned to the same assignee as the present application. The first booster outlet 29 is connected to fourth inlets 31 leading to pressure spaces 7 behind stepped modulator piston assemblies 8 of a triple master cylinder assembly, and the second booster outlet 30 is connected to third inlets 32 leading to third pressure spaces 9 at the step in diameter of the modulator piston assemblies.

The third accumulator 5 supplies fluid at a second pressure to three solenoid operated skid control valves 10 each of which is connected to a second inlet 33 leading to a second pressure space 11 ahead of the modulator piston assembly 8. Each of the modulator piston assemblies has a forward extension 12 adapted to apply a master cylinder piston. The master cylinders themselves which are adapted to be operated by the extension 12, either single or tandem, and the connections from the master cylinders are not shown. The means for activating the control valves and the reservoir return connections from the booster valve are also not shown.

Figure 2:
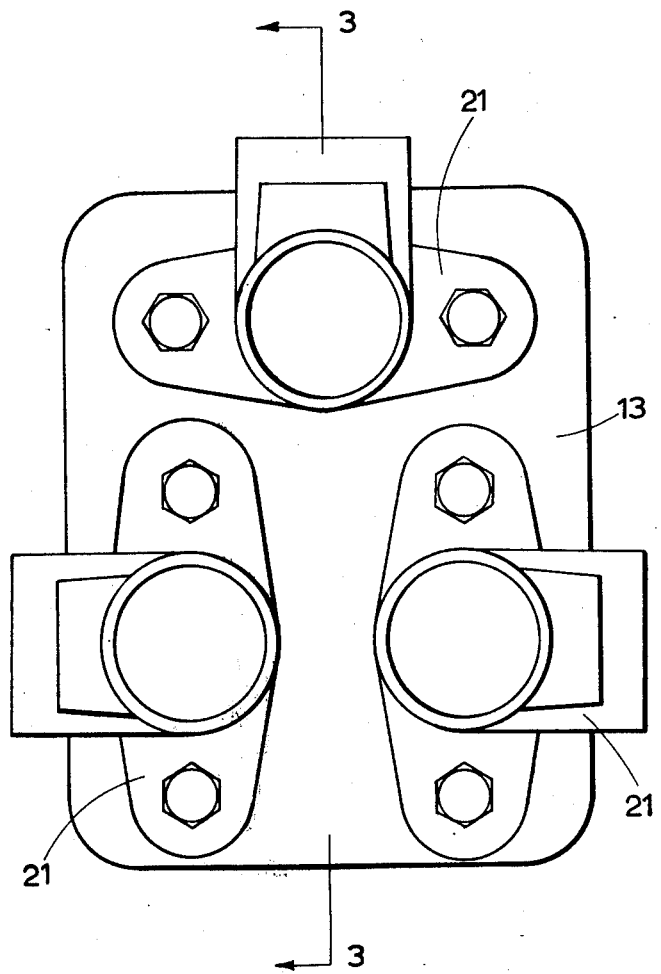
FIG. 2 is an end view of a master cylinder assembly for use with a remote booster valve assembly.
Figure 3:
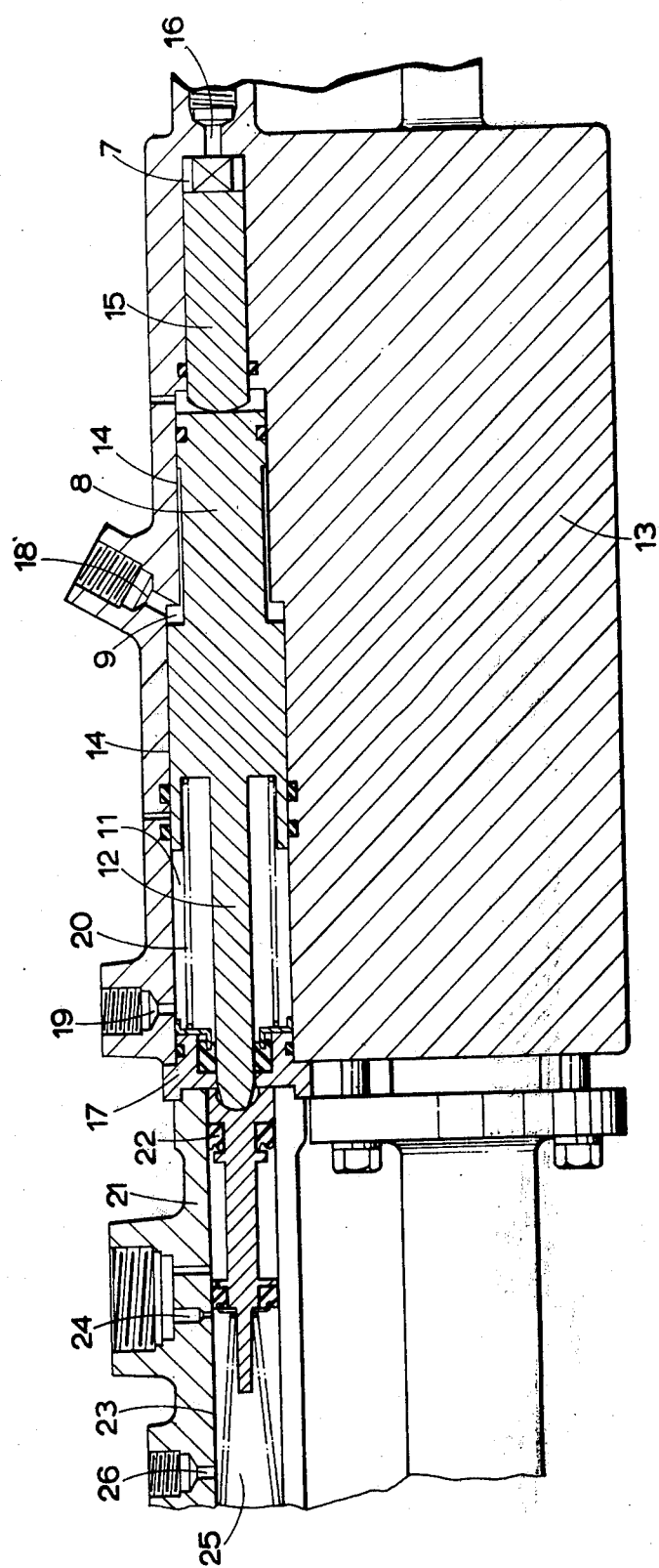
FIG. 3 is a section on the line 3—3 of FIG. 2.

FIGS. 2 and 3 show a triple master cylinder assembly comprising a cylinder block 13 having three parallel longitudinal cylinder bores 14, one bore being located above and between two side-by-side lower bores. Each bore receives a modulator piston assembly comprising larger and smaller diameter portions 8 and 15 respectively in abutment with each other, the fourth pressure space 7 being defined behind the smaller diameter portion 15 and being connected to the booster valve assembly (not shown) by means of a fourth inlet port 16 at the end of the housing. At the other end of the housing, the bores 14 are closed by an end plate 17 which receives the forward extension 12 from modulator piston portions 8, a second inlet port 19 and a third inlet port 18 lead into the second and third pressure spaces 11 and 9 respectively and are located at the particular side of the housing which is adjacent to the bore. A return spring 20 for each modulator piston assembly acts between the piston portion 8 and the end plate 17. Conventional hydrostatic master cylinders 21 are bolted to the end of the housing to register with the extensions 12. Each master cylinder 21 comprises a piston 22 working in a bore 23 for controlling communication between a first inlet or recuperation port 24 for connection to a reservoir for hydraulic fluid and a first pressure space 25 in advance of the piston 22. Normally the recuperation port 24 is open but when the piston 22 is advanced in the bore 23 initially the recuperation port 24 is closed and thereafter fluid in the pressure space 25 is pressurized and is supplied to the brakes through an outlet port 26.

Operation of the piston 22 of the master cylinders 21 is as described above, the booster valve assembly 6 being connected to inlet ports 16 and 18 and the control valves being connected to inlet ports 19. The skid conditions, when the control valves are actuated control pressure acting on the modulator piston assemblies opposes the booster pressure to relieve the force applied to the master cylinder or cylinders 21.

I claim:

1. A master cylinder assembly for a vehicle hydraulic braking system comprising a housing having a first bore and a second bore, a modulator piston assembly working in said second bore, a master cylinder piston working in said first bore and adapted to be advanced in said first bore on advancement of the modulator piston assembly in said second bore, said housing being provided with a first pressure space defined in said first bore in front of said master cylinder piston, and with second, third, and fourth independent pressure spaces in said second bore and bounded by said modulator piston assembly, pressurisation of said second pressure space causing said modulator piston assembly to be urged rearwardly, whereas pressurisation of either of said third or fourth pressure spaces causing said modulator piston assembly to be urged forwardly, said housing being provided with a first inlet port for connecting said first pressure space to a fluid reservoir, with an outlet port leading from said first pressure space for connecting to a wheel brake, with a second inet port leading into said second pressure space, and with third and fourth inlet ports leading respectively into said third and fourth pressure spaces, a normally open valve controlling communication between said first pressure space and said first inlet port and being adapted to close on forward movement of said master cylinder piston from its retracted position, said master cylinder assembly further comprising a dual booster valve assembly comprising first and second hydraulically separate booster valves, a single actuating member controlling both booster valves, said first booster valve being provided with a first booster valve inlet and a first booster valve outlet, said second booster valve being provided with a second booster valve inlet and a second booster valve outlet, said first and second booster valve inlets being connected to two separate supplies of pressure fluid, means connecting said first and second booster valve outlets independently to said third and fourth pressure spaces in said housing respectively, whereby on actuation of said actuating member pressure fluid is supplied to both said third and fourth pressure spaces when both of said pressure fluid supplies are operational, and is supplied to one of said third and fourth pressure spaces on failure of either of said supplies to advance the modulator piston assembly.

2. A master cylinder assembly as in claim 1 wherein said modulator piston assembly comprises a portion of larger diameter in front of a portion of smaller diameter, said third pressure space being defined behind said portion of smaller diameter, and said fourth pressure space being defined between a step in said second bore and said larger diameter portion.

3. A master cylinder assembly as in claim 1 wherein said actuating member of said dual booster valve assembly is pedal-operated, said booster valve assembly being remote from said housing.

4. A master cylinder as in claim 1 wherein there is at least two master cylinder pistons, and a modulator piston assembly is provided for each master cylinder piston.

5. A master cylinder assembly as in claim 1 including a third fluid pressure supply separate from said first and second supplies, and skid control means connected between said third supply and said second inlet port of said housing.

* * * * *